United States Patent [19]

Wang

[11] Patent Number: 4,499,977
[45] Date of Patent: Feb. 19, 1985

[54] INTEGRAL PARK BRAKE MECHANISM

[75] Inventor: Nui Wang, Punchbowl, Australia

[73] Assignee: Girlock Limited, Australia

[21] Appl. No.: 490,588

[22] Filed: May 2, 1983

[30] Foreign Application Priority Data

Aug. 25, 1982 [AU] Australia .............................. PF5553

[51] Int. Cl.³ ............................................. F16D 55/26
[52] U.S. Cl. ..................................... 188/72.6; 188/67; 188/72.3; 188/106 F
[58] Field of Search .................... 188/72.8, 72.9, 72.7, 188/72.6, 72.4, 72.3, 72.1, 106 F, 216, 67, 71.4

[56] References Cited

U.S. PATENT DOCUMENTS

| | | | |
|---|---|---|---|
| 3,371,750 | 3/1968 | Schutte et al. | 188/72.6 X |
| 3,435,922 | 4/1969 | Schmid | 188/72.6 X |
| 3,893,730 | 7/1975 | Homier et al. | 188/67 X |
| 3,983,966 | 10/1976 | Bryant | 188/67 X |
| 4,363,382 | 12/1982 | Anderson | 188/72.6 X |

Primary Examiner—Douglas C. Butler
Attorney, Agent, or Firm—Steinberg & Raskin

[57] ABSTRACT

A disk brake operating mechanism including an hydraulically operated piston in a cylinder arranged to move a friction pad into contact with a disc, in which a mechanically actuated brake operating mechanism is provided, the mechanism consisting of a piston rod abutting the piston and being axially movable in relation to it. An actuating collar is arranged around the piston rod at a position outside the piston and is supported at a part of its circumference against movement towards the cylinder by a stop. A strut or other device is provided to enable an actuating force to be applied to the part of the collar diametrically opposite the stop to cause it to lock onto the piston rod and move the piston rod to effect application of the pad to the disk. The geometry of the actuating collar, the stop supporting the actuating collar and the piston rod are such that while the collar locks onto the piston rod when force is applied to it when that force is removed frictional forces resisting the recovering of elastic strain in the system form a couple that unlocks the collar from the piston rod so that hydraulic operation of the brake can be effected independently of the parts of the mechanically actuated brake operating mechanism other than the piston rod.

3 Claims, 6 Drawing Figures

INTEGRAL PARK BRAKE MECHANISM

BACKGROUND OF THE INVENTION

The present invention relates to an integral park brake mechanism in a disc brake actuator.

In the application of disc brakes to motor vehicles it was found difficult to device a mechanism whereby a manually operable parking brake could be applied to a hydraulically operated disc brake system. In some cases the difficulty was met by merely providing disc brakes at the front of the vehicle with conventional drum brakes at the back on which the manually operated mechanical parking brake system acted. In more expensive vehicles disc brakes were provided back and front with separate drums incorporated in the rear disc brakes on which the parking brake acted or separate mechanical calipers dedicated only to parking were provided.

More recently, however, many of the design problems have been overcome and arrangements are available in which a disc brake can be applied either hydraulically or manually through a mechanical system. Such mechanical systems necessitate the use of arrangements providing a high mechanical advantage so that the force that has to be applied to the parking brake lever is not unduly great. Such arrangements are extremely sensitive to the presence of clearances in the system and for this reason most existing designs employ a form of clearance adjuster.

In Australian Patent Specification No. 405,184 there is described a clearance adjuster in which mechanical operation of the brake is effected by means of a stem having a plain cylindrical surface which extends rearwardly from a piston arranged to apply force to a friction pad, the stem passing through a single collar free to tilt about an axis transverse to that of the stem. In manual actuation of the brake, force is applied to the collar through a member having a face inclined at an angle to a plane at right angles to the axis of the assembly so that when the brake is applied mechanically by thrust applied to the member that member applies an offset force to the collar which causes it to lock onto the stem and so transmit the thrust through the stem to a piston and the friction pad. In practice this arrangement was not found to be satisfactory and was never applied commercially.

A problem with the construction described is the inability of the collar to loosen automatically when the tilting load is removed and there is a tendency for the mechanism to stick making it necessary to incorporate a strong return spring to unlock the collar upon removal of the load.

A further problem is that the mechanism acts as a one way adjuster prone to overadjustment to the elastic deflection resulting from hydraulic application of the brake. That is to say that the adjuster is load sensitive.

SUMMARY OF THE INVENTION

The present invention provides a construction which assists in overcoming these problems.

The present invention consists in the provision in a disc brake operating mechanism including an hydraulically operated piston in a cylinder arranged to move a friction pad into contact with a disc, of a mechanically actuated brake operating mechanism consisting of a piston rod abutting the piston and being axially movable in relation thereto, an actuating collar having a bore surrounding the piston rod at a position outside said piston, a stop to support a part of the circumference of the actuating collar against movement towards the cylinder and a means to apply an actuating force to a part of the collar diametrically opposed to the first mentioned part, the geometry of the actuating collar, the stop supporting the actuating collar, and the piston rod being such that on application of a force to said actuating collar by said means the actuating collar locks on the piston rod and moves the piston rod to effect application of the pad to the disc and such that on removal of said force frictional forces resisting the recovery of elastic strain in the system form a couple that unlocks the actuating collar from the piston rod whereby hydraulic operation of the brake can be effected independently of the parts of the mechanically actuated brake operating mechanism other than the piston rod.

BRIEF DESCRIPTION OF THE DRAWINGS

In order that the nature of the invention may be better understood a preferred form thereof is hereinafter described, by way of example, with reference to the accompanying drawings in which.

DETAILED DESCRIPTION OF PREFERRED EMBODIMENTS

Figure 1:
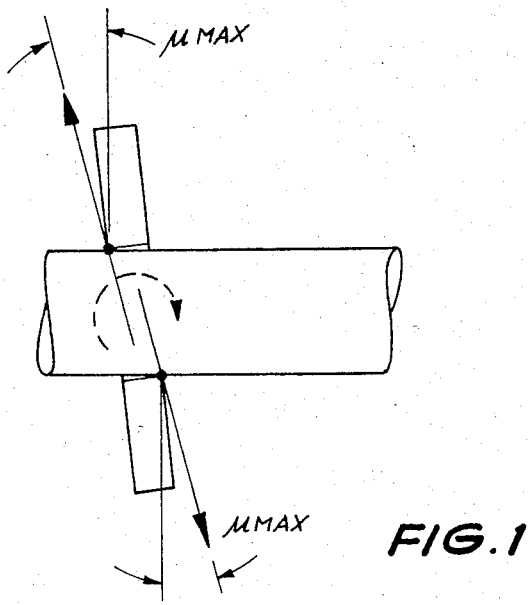
FIGS. 1, 2, 3, 4a and 4b illustrate features of the geometry of the actuating collar and the piston rod passing through it.
Figure 2:
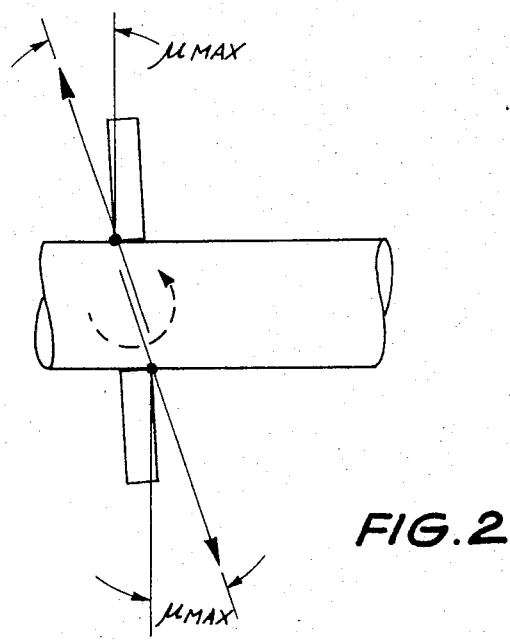

The satisfactory functioning of a construction according to the invention involves the use of a geometry of the actuating collar and the piston rod in which the requirements of locking during actuation and self releasing after the actuation are both satisfied. FIGS. 1 and 2 illustrate respectively a self releasing geometry and a non-releasing geometry. In the former frictional forces resisting recovery of elastic strain give rise to a couple forming a clock-wise moment that unlocks the actuating collar whereas in the non-releasing geometry a couple forms an anti-clockwise moment that locks the actuating collar on the piston rod. In both FIG. 1 and FIG. 2 the couples are set up as a result of an axial force applied to the actuating collar parallel to the axis of the piston rod.

Figure 3:
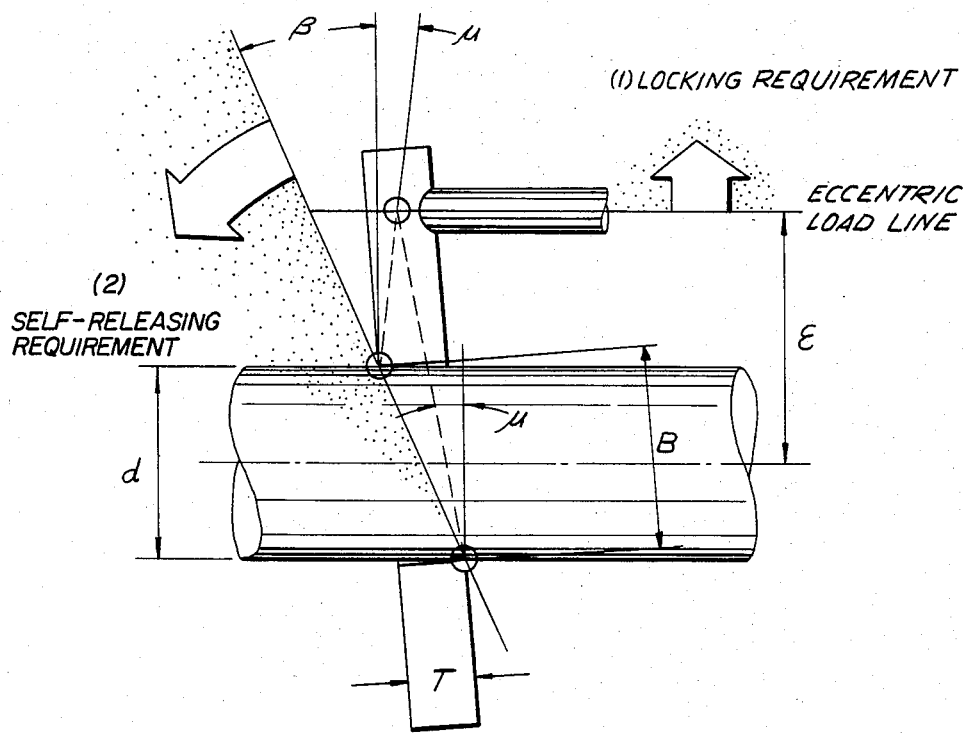

FIG. 3 illustrates the parameters that have to be taken into account in establishing whether a particular construction will meet the requirements of both locking during actuation and self-releasing after the actuation. In this configuration if:

T is the effective thickness of the collar.

d is the diameter of the piston rod.

B is the diameter of the aperture in the actuating collar.

B is the angle between a line joining the two contact points and a line at right angles to the axis of the piston rod, and $\mu$ is the friction angle of the contact points of the piston rod and the collar. It has a maximum valve of $\mu_{max}$ and a minimum value of $\mu_{min}$.

$\epsilon$ is the distance between the axis of the piston rod and the line of action of the force applied to the collar.

Both the requirements set out above are satisfied if:

$$\epsilon > \frac{\sqrt{T^2 + B^2} - d^2}{2 \tan \mu \min} \quad (1)$$

and $$\beta = \tan^{-1}\left(\frac{\sqrt{T^2 + B^2} - d^2}{d}\right) > \mu \max \quad (2)$$

A second requirement is that the actuating collar and the piston rod are free to move relative to each other when not actuated, i.e. when the hand brake is off, but become connected only when actuated. This is achieved by supporting the end of the actuating collar diametrically opposite to the actuating end, at a level such that in the hand brake off position the angle of tilt of the actuating collar is slightly less than that required for locking as depicted in FIG. 4a.

Figure 4:
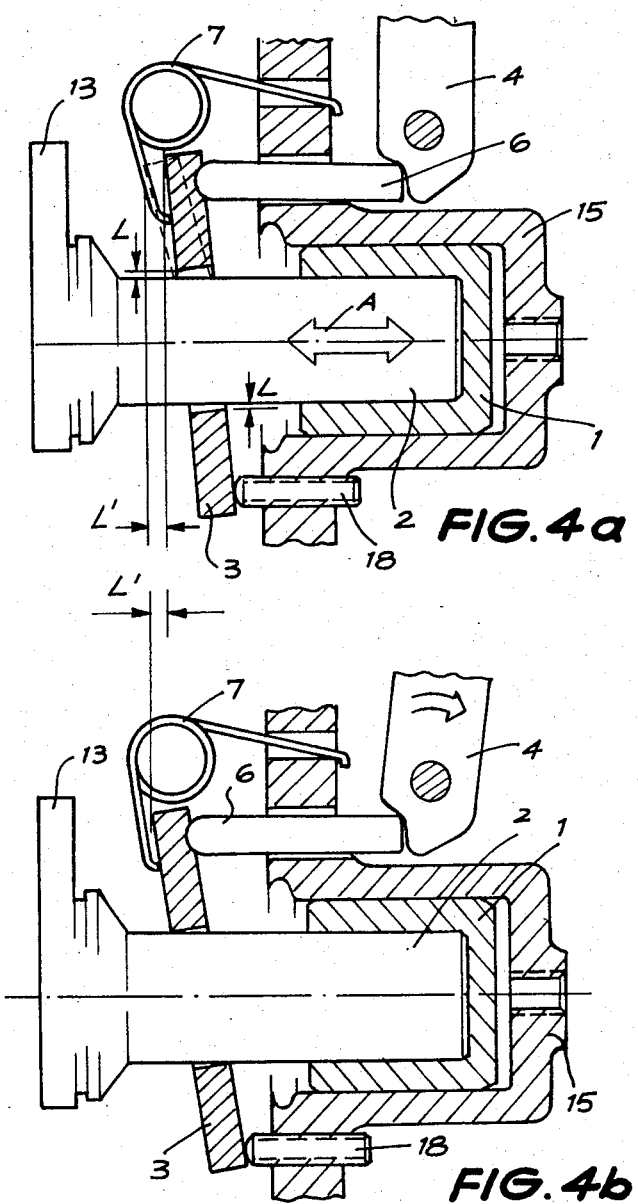

FIG. 4b illustrates the situation when the handbrake has been actuated and the collar 3 tilted to grip the piston rod 2. The free play is indicated at L and the lost travel at L'. It will be seen from FIGS. 4a and 4b that the coil spring 7 is used to hold the collar against both a stop 18 and an actuating strut 6. While this spring does assist in releasing the collar from the piston rod this is not its prime intention as the self-releasing feature is obtained from the geometry of the construction.

The fact that the piston rod 2 can move freely in the directions of the arrow A at FIG. 4a when the hand brake is off completely eliminates load sensitivity or over adjustment by the park brake mechanism. It also allows easy replacement of pads. In most screw adjuster designs of integral park brake mechanisms the piston has to be wound back to allow new pads to be inserted. With the previous lock collar design described in Australian Patent Specification No. 405,184 the collar is required to be "squared" by a pin inserted from the back of the cylinder before the piston can be retracted. In a construction according to the invention however the piston can be retracted in a manner similar to that of a conventional hydraulic caliper brake.

In many integral park brake designs effective "roll back" of the seal is affected by tolerance built up in the various mechanical components and the mechanical stroking of the seal. With construction according to the invention the roll back of the seal is determined solely by hydraulic brake application and remains unchanged after handbrake application. Whatever clearance and tolerance is built up in the park brake mechanism does not alter the operating clearance of the hydraulic operating brake. Since application of the parkbrake does not disturb the hydraulic seal, relaxation of the strained seal does not take place. In most conventional design, parkbrake application keeps the seal mechanically strained, which tend to relax with time, causing high brakes off drag.

Figure 5:
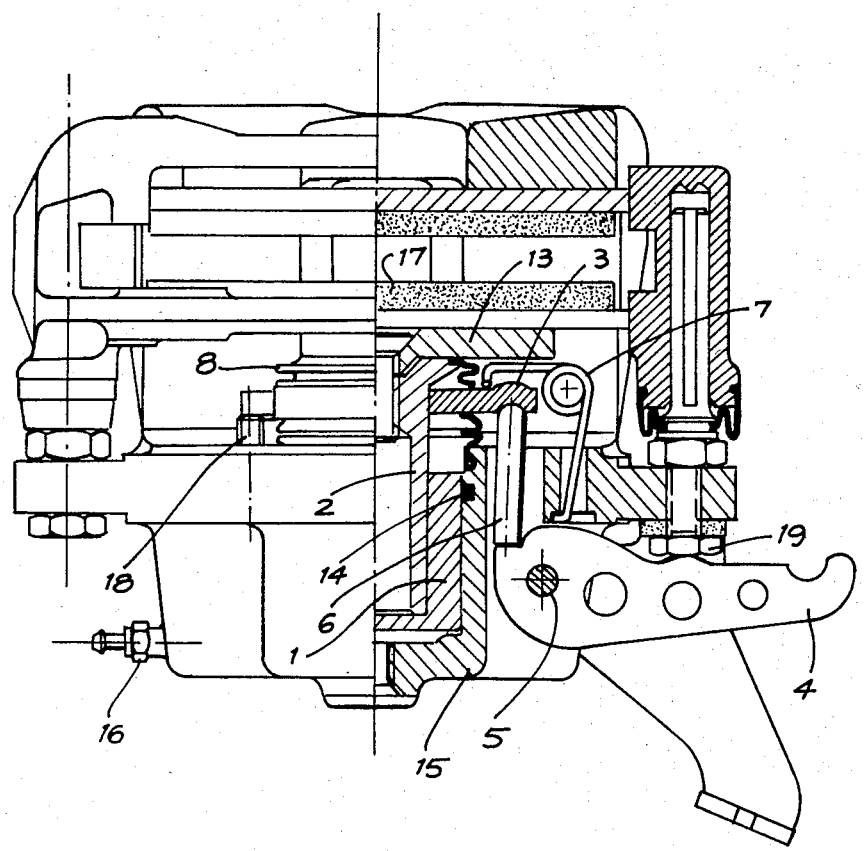
FIG. 5 is a half sectional plan view, of a disc brake assembly incorporating an integral park brake mechanism according to the invention.

In the arrangement shown in FIG. 5, the reference numerals used are as in FIGS. 4a and 4b and 1 is a piston sliding in a cylinder 15 to which hydraulic fluid under pressure can be admitted through the connection 16. A seal 14 is provided between the piston 1 and the cylinder 15. Slidingly fitted within the piston 1 is a piston rod 2 with a reaction plate 13 attached to its end which itself is in contact with the back plate of the inboard pad 17 of the brake assembly.

Arranged around the piston rod 2 is an actuating collar 3 having in it a bore surrounding the shaft. A part of the circumference of the actuating collar 3 shown to the left of the piston rod 2 in the drawing is supported by an adjustable stop 18 attached to the cylinder 15. At a point diametrically opposite this part, contact is made with the actuating collar by a strut 6 which is arranged between the actuating collar and the lever 4 which is pivoted at 5. A boot 8 is provided as indicated in FIG. 5.

The park brake mechanism is actuated mechanically by operation of the lever 4. This acts on one side of the actuating collar 3 through the strut 6 causing the collar to tilt and to lock onto the piston rod 2 moving it away from the cylinder 15 thus causing mechanical actuation of the brake. A release of the force on the actuating collar 3 causes it to unlock from the piston rod 2 by reason of the geometry described above allowing normal hydraulic actuation of the brake. The actuating collar 3 is held in contact with the strut 6, lever 4 and its stop 19 on one side and adjustable stop 18 on the other side, by the spring 7.

Most integral park brake designs require extra hydraulic seals in addition to the piston seal. In general, at least two extra seals are required for a "load insensitive" design. In the construction described above no extra seal is used. This reduces cost as well as leak paths.

Because the operation of the park brake mechanism described above is quite independent of the operation of the hydraulic brake, the initial clearance take-up during installation is "one shot", by the hydraulic brake or a small number of strokes, by the park brake. For the same reason, failure of one of the brakes will not affect the function of the other.

The construction described allows the use of a very simple piston shape favouring the use of a moulded plastic piston (e.g. phenolic).

The embodiment of the invention described above is given by way of example only of the invention as defined broadly in the succeeding claims.

I claim:

1. In a disc brake operating mechanism including an hydraulically operated piston in a cylinder arranged to move a friction pad into contact with a disc, the provision of a mechanically actuated brake operating mechanism consisting of a piston rod abutting the piston and being axially movable in relation thereto, an actuating collar having a bore surrounding the piston rod at a position outside said piston, a stop to support a part of the circumference of the actuating collar against movement towards the cylinder and means to apply an actuating force to a part of the collar diametrically opposed to the first mentioned part, the geometry of the actuating collar, the stop supporting the actuating collar, and the piston rod being such that on application of a force to said actuating collar by said means the actuating collar locks on the piston rod and moves the piston rod to effect application of the pad to the disc and such that on removal of said force frictional forces resisting the recovery of elastic strain in the system form a couple that unlocks the actuating collar from the piston rod whereby hydraulic operation of the brake can be effected independently of the parts of the mechanically actuated brake operating mechanism other than the piston rod.

2. The combination claimed in claim 1 wherein the position of said stop is adjustable.

3. The combination claimed in claim 1 or claim 2 wherein resilient means are provided acting to urge said actuating collar against said stop and said means to apply an actuating force to part of the collar.

* * * * *